United States Patent
Blood

(10) Patent No.: US 10,817,058 B1
(45) Date of Patent: Oct. 27, 2020

(54) ELECTRONIC DEVICE WITH EMG SENSOR BASED SCALING CONTROL OUTPUT AND RELATED METHODS

(71) Applicant: Eagle Technology, LLC, Melbourne, FL (US)

(72) Inventor: John W. Blood, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/445,640

(22) Filed: Jun. 19, 2019

(51) Int. Cl.
*G06F 3/01* (2006.01)
*G06F 3/041* (2006.01)

(52) U.S. Cl.
CPC ............. *G06F 3/015* (2013.01); *G06F 3/041* (2013.01)

(58) Field of Classification Search
CPC .................................. G06F 3/015; G06F 3/041
See application file for complete search history.

(56) References Cited

U.S. PATENT DOCUMENTS

| | | | |
|---|---|---|---|
| 5,349,962 A * | 9/1994 | Lockard | A61B 5/048 600/544 |
| 5,447,166 A | 9/1995 | Gevins | |
| 5,508,717 A | 4/1996 | Miller | |
| 6,053,814 A | 4/2000 | Pchenitchnikov et al. | |
| 6,203,432 B1 | 3/2001 | Roberts et al. | |
| 7,331,870 B2 | 2/2008 | Smith et al. | |
| 8,170,656 B2 | 5/2012 | Tan et al. | |
| 8,979,658 B1 | 3/2015 | Kulavik | |
| 9,612,661 B2 | 4/2017 | Wagner et al. | |
| 2005/0255918 A1 | 11/2005 | Riggs et al. | |
| 2008/0227546 A1 | 9/2008 | Roberts | |
| 2009/0233710 A1 | 9/2009 | Roberts | |
| 2009/0325705 A1 | 12/2009 | Filer et al. | |
| 2011/0009193 A1 | 1/2011 | Bond et al. | |
| 2011/0130876 A1 | 6/2011 | Gao et al. | |
| 2011/0260830 A1 | 10/2011 | Weising | |
| 2013/0116514 A1 * | 5/2013 | Kroner | A61B 5/01 600/301 |
| 2013/0120246 A1 * | 5/2013 | Schuette | G06F 3/015 345/156 |
| 2014/0135593 A1 * | 5/2014 | Jayalth | A61B 5/6805 600/301 |
| 2016/0082318 A1 * | 3/2016 | Meek | A63B 24/0062 434/247 |
| 2016/0302686 A1 * | 10/2016 | Einarsson | A61F 2/60 |
| 2018/0055403 A1 | 3/2018 | Yamamoto et al. | |

OTHER PUBLICATIONS

Advancer Technologies, LLC: [DIY] Conductive Fabric Electrodes; http://www.advancertechnologies.com/2013/03/diy-conductive-fabric-electrodes.html; retrieved from internet May 1, 2019; pp. 4.
Ervilha et al. "A simple test of muscle coactivation estimation using electromyography" Braz J Med Biol Res, Oct. 2012, vol. 45(10) 977-981; pp. 6.

* cited by examiner

*Primary Examiner* — Rodney Amadiz
(74) *Attorney, Agent, or Firm* — Allen, Dyer, Doppelt + Gilchrist, P.A.

(57) ABSTRACT

An electronic device may include an EMG sensor to be coupled to a user. The electronic device may include a control device configured to generate a control output based upon a control input and to change a scaling between the control input and the control output based upon the EMG sensor. The EMG sensor may include a pair of EMG sensors, with each EMG sensor being associated with a respective one of opposing muscles of the user.

18 Claims, 6 Drawing Sheets

ELECTRONIC DEVICE WITH EMG SENSOR BASED SCALING CONTROL OUTPUT AND RELATED METHODS

TECHNICAL FIELD

The present disclosure relates to the field of electronic devices, and, more particularly, to control devices and related methods.

BACKGROUND

Input devices are ubiquitous in the digital age, and are commonly used for converting user input into an output signal for a device to be controlled. Indeed, input devices are applied in a wide variety of devices, ranging from video games/simulator controllers to complex robotic systems (e.g. manufacturing, ordinance disposal, search and rescue missions, environmental analysis, or inspection at toxic sights).

In typical input devices, the input device measures user inputs using one or more sensors and converts the sensed user input into corresponding output signals that are transmitted to the destination electronic device to be controlled. For example, in the robotic system application, the user inputs will cause it to move in a desired manner in accordance with the transmitted output signals. In one common input device for the robotic system, a joystick device measures angle and direction of mechanical input, and generates the output signal.

In the typical input device, the conversion of the sensed user input into the output signal is based upon a static scaling factor. Although this static scaling factor does provide for predictable touch and feel in the input device, this may not be desirable when the user and associated application demands both fine control as well as twitchy/fast/responsive controls.

SUMMARY

Generally, an electronic device may include at least one electromyography (EMG) sensor to be coupled to a user. The electronic device may include a control device configured to generate a control output based upon a control input and to change a scaling between the control input and the control output based upon the at least one EMG sensor.

Additionally, the at least one EMG sensor may comprise a pair of EMG sensors, and each EMG sensor may be associated with a respective one of opposing muscles of the user. The control device may be configured to set the control output to a constant based upon the at least one EMG sensor exceeding a threshold.

In some embodiments, the control device may comprise an input device to be manipulated by the user, and an actuator responsive to the input device. In other embodiments, the control device may comprise a touchscreen input device to be manipulated by the user, and a visual indicator responsive to the touchscreen input device.

Also, the electronic device may further comprise a garment to be worn by the user and carrying the at least one EMG sensor. The at least one EMG sensor may comprises an electrode in contact with a respective muscle of the user. The control device may be configured to change the scaling based upon at least one other biometric value from the user. The control device may be configured to change the scaling without user interaction.

Another aspect is directed to a method for making an electronic device. The method may include coupling at least one EMG sensor to a user, and operating a control device configured to generate a control output based upon a control input and to change a scaling between the control input and the control output based upon the at least one EMG sensor.

DETAILED DESCRIPTION

Figure 1:
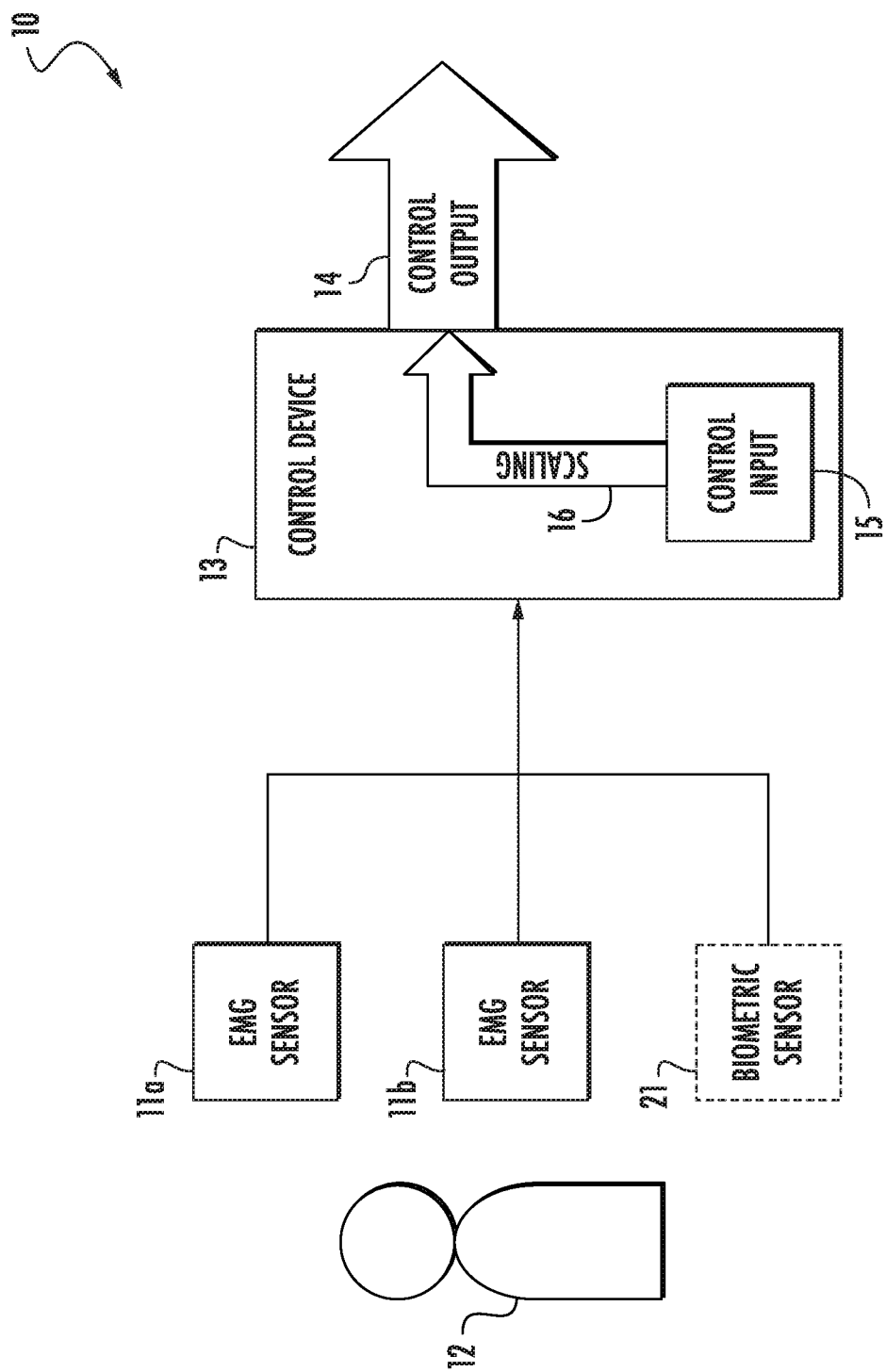
FIG. 1 is a schematic diagram of a first embodiment of an electronic device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

The input device with the static scaling factor may not be desirable when the user and associated application demand finer control. For example, for devices that are used to perform a variety of tasks, optimizing the controller sensitivity based on the task being performed ensures the ideal speed and precision. Properly balancing speed and precision of the controller improves the user experience, safety, and performance level.

Controller sensitivity may be considered as a ratio between the device output and the controller input. This ratio of the device to the controller can include the magnitude and speed of controller displacement as well as magnitude, speed, and torque of the device displacement, depending on the desired control method for that particular device or application.

In some prior art approaches, the user may manually adjust the controller sensitivity. In electronic applications, manually adjusting controller sensitivity may require the user to stop what they are doing, open a menu, and adjust the sensitivity by guessing how much they should adjust it by. In some mechanical applications, the users have buttons on the controller used to adjust the sensitivity. In prior art approaches, because of the annoyance of manual calibration of controller sensitivity, users may sacrifice performance by using a default controller sensitivity rather than interrupt the task to manually adjusting their controller sensitivity.

To give users the full benefits of a controller sensitivity ideal to the task being performed, the controller sensitivity should be automatically adjusted, as disclosed herein. In cases where a priori knowledge of the task is available, automatically adjusting the controller sensitivity may be possible. However, in many cases, a priori knowledge is unavailable. In some mechanical applications, there is no knowledge by the device of what task it is performing, forcing it to rely solely on human input. Automatically adjusting the controller sensitivity without a priori knowledge of the task is a problem addressed by the electronic device disclosed herein.

Figure 2:
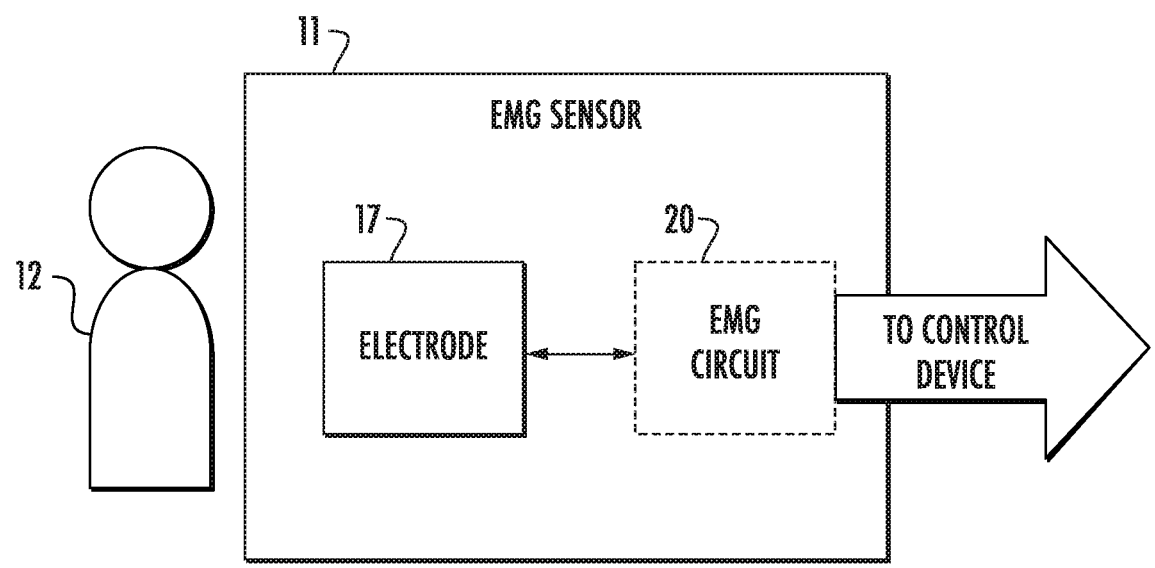
FIG. 2 is a schematic diagram of an example embodiment of the EMG sensor from the electronic device of FIG. 1.

Referring initially to FIGS. 1-2, an electronic device 10 according to the present disclosure is now described. The electronic device 10 illustratively comprises a pair of EMG sensors 11a-11b to be coupled to a user 12. Of course, in some embodiments, a single EMG sensor could be used. Each EMG sensor 11a-11b is associated with a respective one of opposing muscles of the user 12. In other words, the opposing muscles of the user 12 are muscles that move in opposite directions, that is, they are agonist and antagonist muscle pairs (e.g. triceps and biceps). As will be appreciated, coactivation of these opposing muscles is indicative of joint stability.

The electronic device 10 illustratively includes a control device 13 configured to generate a control output 14 based upon a control input 15 and to change a scaling 16 between the control input and the control output based upon the pair of EMG sensors 11a-11b. In particular, the control device 13 is configured use the pair of EMG sensors 11a-11b to detect muscle coactivation in the respective one of opposing muscles of the user 12 (i.e. the control device is monitoring for coactivation).

In some embodiments, the electronic device 10 illustratively includes a biometric sensor 21 (shown with dashed lines and can be omitted depending on the embodiment) coupled to the control device 13 and configured to generate another biometric value. The other biometric value may comprise one or more of heart rate, concentration measured by electroencephalogram (EEG), breathing rate, and skin conductance response (galvanic skin response). The control device 13 may be configured to change the scaling 16 based upon at least the other biometric value from the user 12. In some embodiments, the control device 13 may be configured to change the scaling 16 without user interaction (i.e. this is an automatic adjustment).

In FIG. 2, each of the pair of EMG sensors 11a-11b illustratively includes an electrode 17 in contact with a respective muscle of the user 12, and an EMG circuit 20 coupled to the electrode. In some embodiments, each of the pair of EMG sensors 11a-11b includes a plurality of electrodes (e.g. 3 electrodes). The first electrode is located at the base of the muscle, and the second electrode is located in the middle of the muscle. The first and second electrodes provide the electrical difference therebetween. The third electrode functions as the right leg drive, which is used to set a reference point and eliminate environmental electrical noise by grounding a neutral part of the user's body, such as their right leg for cardiograms or their elbow.

The EMG circuit 20 is shown with dashed lines, and in other embodiments, the EMG circuit 20 could be integrated within the control device 13. In some embodiments, the control device 13 is coupled to each of the pair of EMG sensors 11a-11b via a wired connection. In other embodiments, the control device 13 is coupled to each of the pair of EMG sensors 11a-11b via a wireless connection (e.g. Bluetooth, Zigbee).

Figure 3:
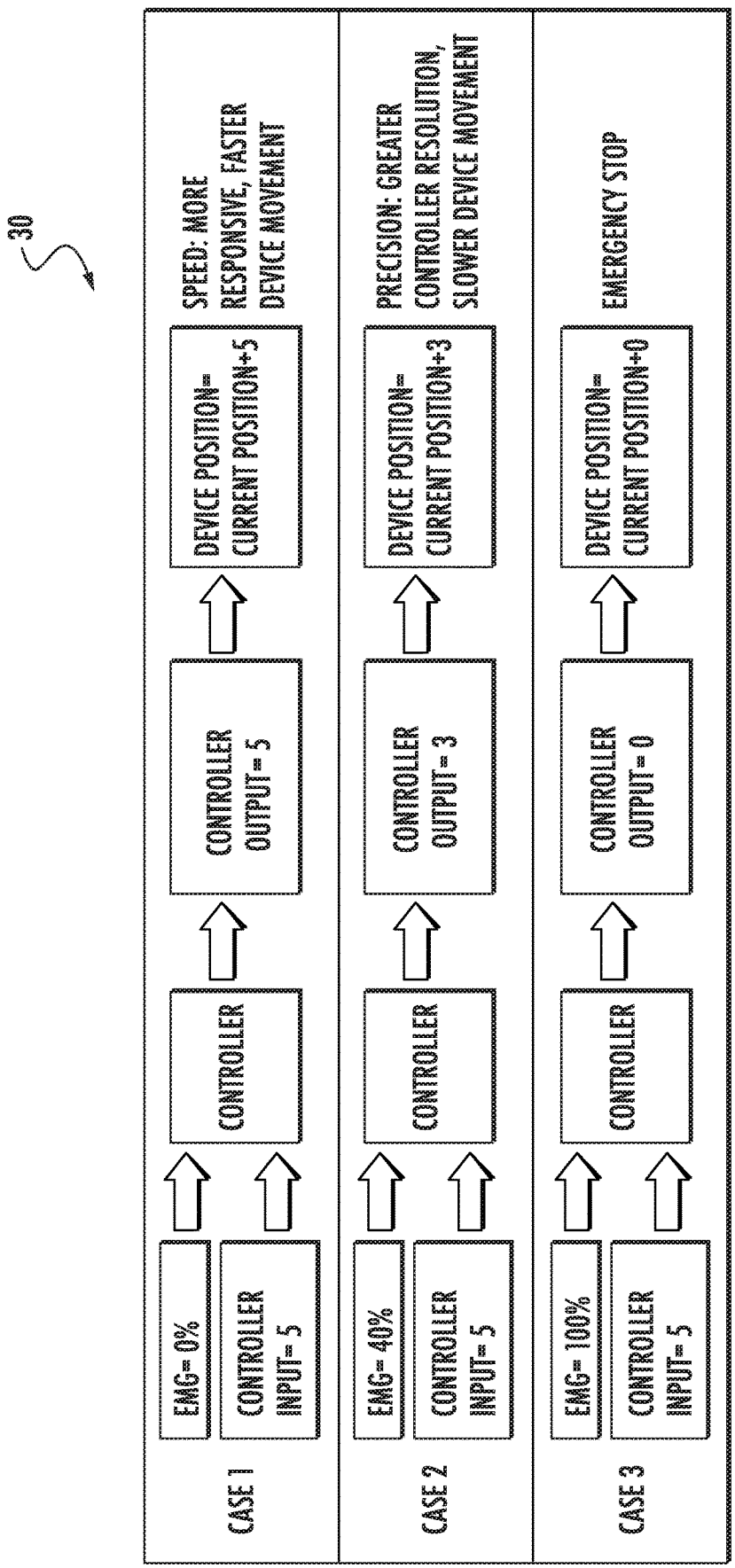
FIG. 3 is a chart of scaling for an example embodiment of the control device from the electronic device of FIG. 1.

Referring now to FIG. 3, a chart 30 illustrates the scaling 16 for an example embodiment of the control device 13. As mentioned above, the control device 13 is configured use the pair of EMG sensors 11a-11b to detect muscle coactivation, and the detection process comprises signal processing of the EMG output signals from the pair of EMG sensors to produce a muscle coactivation value.

In one example embodiment, the control device 13 is configured to determine the muscle coactivation value by comparing amplitudes of the EMG output signals from the pair of EMG sensors 11a-11b. Here, the control device 13 is configured to detect near identical amplitudes (±5% of maximum amplitude) of the EMG output signals from the pair of EMG sensors 11a-11b. In another embodiment, the signal processing for detection of opposing muscle coactivation may use the teachings disclosed in, for example: Ervilha et al. "A simple test of muscle coactivation estimation using electromyography." Brazilian journal of medical and biological research=Revista brasileira de pesquisas medicas e biologicas vol. 45,10 ( ) 977-81. doi:10.1590/S0100-879X2012007500092, the entire contents of which are hereby incorporated by reference in their entirety.

In the illustrated chart 30, the greater the percentage, the greater the muscle activation and joint stability. In Case 1 shows a fast sensitivity scenario, and a zero muscle coactivation value from the pair of EMG sensors 11a-11b. In other words, the user is exhibiting no muscle coactivation, and is "loose" so to speak. Because of this, the scaling 16 for this case is 1:1 (i.e. no change). Case 2 shows a precise sensitivity scenario. Here, the muscle coactivation value is 40%, indicating some muscle coactivation. Because of this, the scaling 16 is 5:3 so as to provide greater precision.

In Case 3, the muscle coactivation value is maxed out at 100%. In other words, the user is exhibiting maximum muscle coactivation, and is extremely tense, if not panicked. Because of this, the control device 13 is configured to zero the scaling 16 at 1:0. In other words, there is no control output for safety reasons, and the control device 13 is in an emergency stop mode; the control device 13 is configured to set the control output to a constant (e.g. the illustrated zero value) based upon the pair of EMG sensors 11a-11b exceeding a threshold (i.e. a coactivation maximum threshold).

Also, the control device 13 is configured to set the control output to the constant (e.g. the illustrated zero value) based when the signals from pair of EMG sensors 11a-11b are not available, in other words, the pair of EMG sensors 11a-11b have been disconnected (i.e. exceeding a coactivation minimum threshold). That is, if the pair of EMG sensors 11a-11b is disconnected from the user 12, the control device 13 is configured to zero the control output for safety.

Also, although the exemplary chart 30 shows three levels of the scaling 16 or controller sensitivity, in some embodiments, there may be more levels of scaling. Also, in other embodiments, the scaling 16 may operate on a formulaic progression (e.g. a linear formula) with regards to the muscle coactivation value.

The control output 14 is transmitted to the device to be controlled, which can be any electronically controlled device. For example, in some embodiments, the device to be controlled is one of a mechanical actuator (FIG. 5), a touchscreen device (FIG. 6), a radio controlled vehicle, a video game, an exoskeleton suit, heavy machinery, such as explosive ordinance disposal robots, or robot assisted laparoscopic surgery.

Another aspect is directed to a method for making an electronic device 10. The method includes coupling a pair of EMG sensors 11a-11b to a user 12, and operating a control device 13 configured to generate a control output 14 based upon a control input 15 and to change a scaling 16 between the control input and the control output based upon the pair of EMG sensors.

Figure 4:
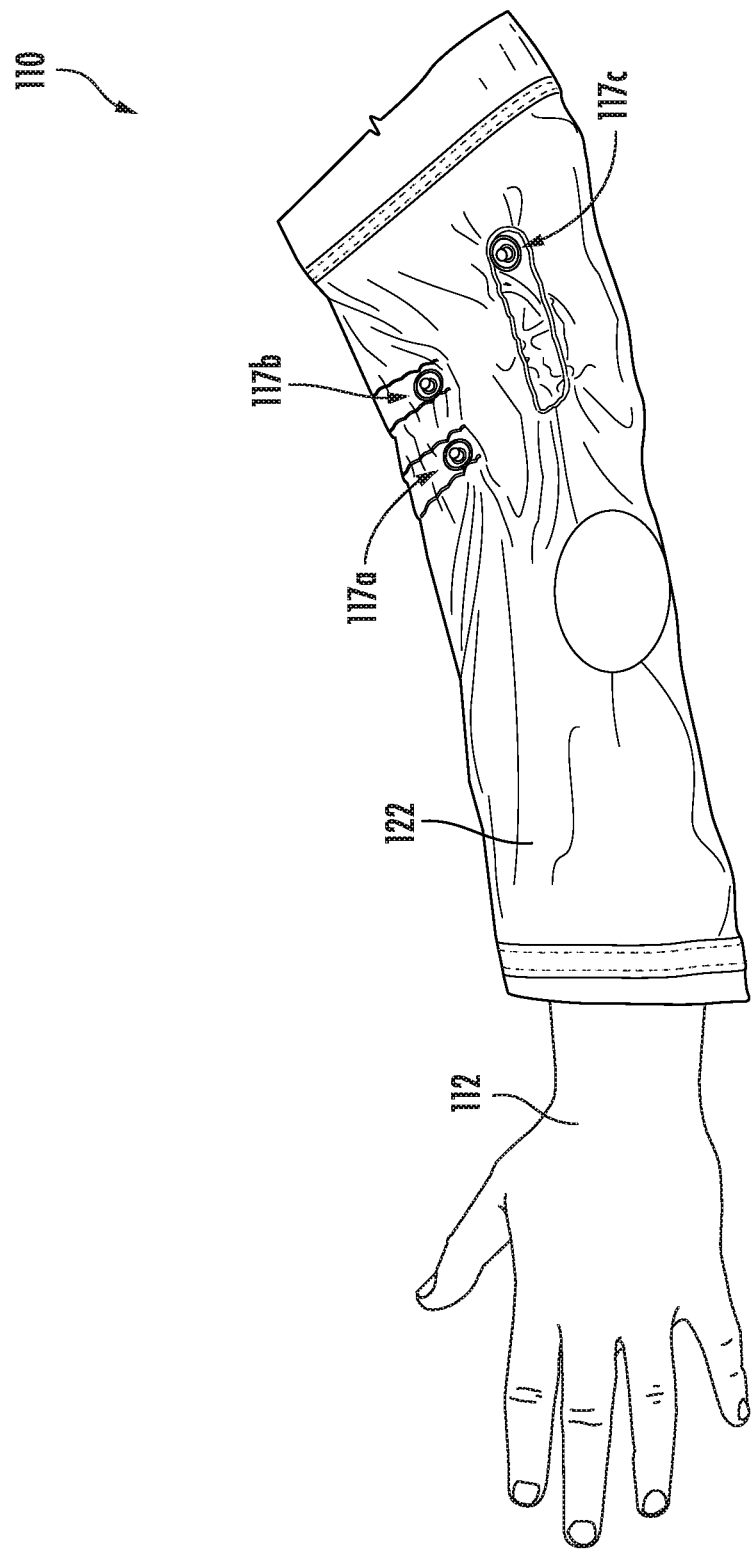
FIG. 4 is a schematic diagram of an example embodiment of the EMG sensor carried by a garment from the electronic device of FIG. 1.

Referring now additionally to FIG. 4, another embodiment of the electronic device 110 is now described. In this embodiment of the electronic device 110, those elements already discussed above with respect to FIGS. 1-2 are incremented by 100 and most require no further discussion herein. This embodiment differs from the previous embodiment in that this electronic device 110 illustratively includes the electronic device comprising a garment 122 (e.g. the illustrative sleeve) to be worn by the user 112 and carrying a plurality of electrodes 117a-117c. Helpfully, the garment 122 permits the user 112 to easily wear the plurality of electrodes 117a-117 while controlling the electronic device 110. In particular, in this embodiment, the plurality of electrodes 117a-117 each includes a button connector for wired connection. Of course, in other embodiments, wireless communication can be used, and the button connectors would be omitted.

Figure 5:
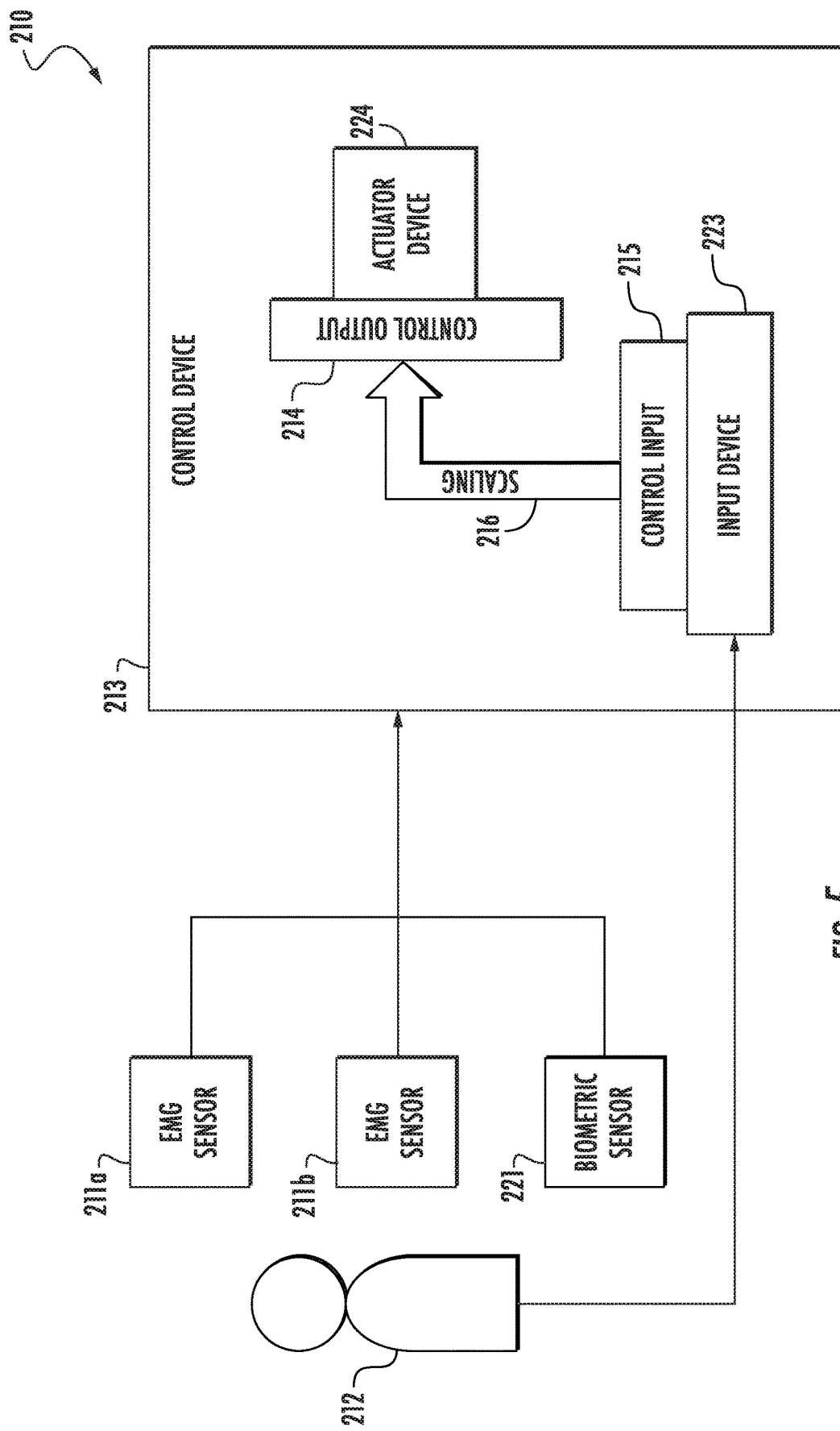
FIG. 5 is a schematic diagram of a second embodiment of the electronic device, according to the present disclosure.

Referring now additionally to FIG. 5, another embodiment of the electronic device 210 is now described. In this embodiment of the electronic device 210, those elements already discussed above with respect to FIGS. 1-2 are incremented by 200 and most require no further discussion herein. This embodiment differs from the previous embodiment in that this electronic device 210 illustratively includes the control device 213 comprising an input device 223 (e.g. a joystick) to be manipulated by the user 212, and an actuator 224 responsive to the input device (i.e. a mechanical application).

Figure 6:
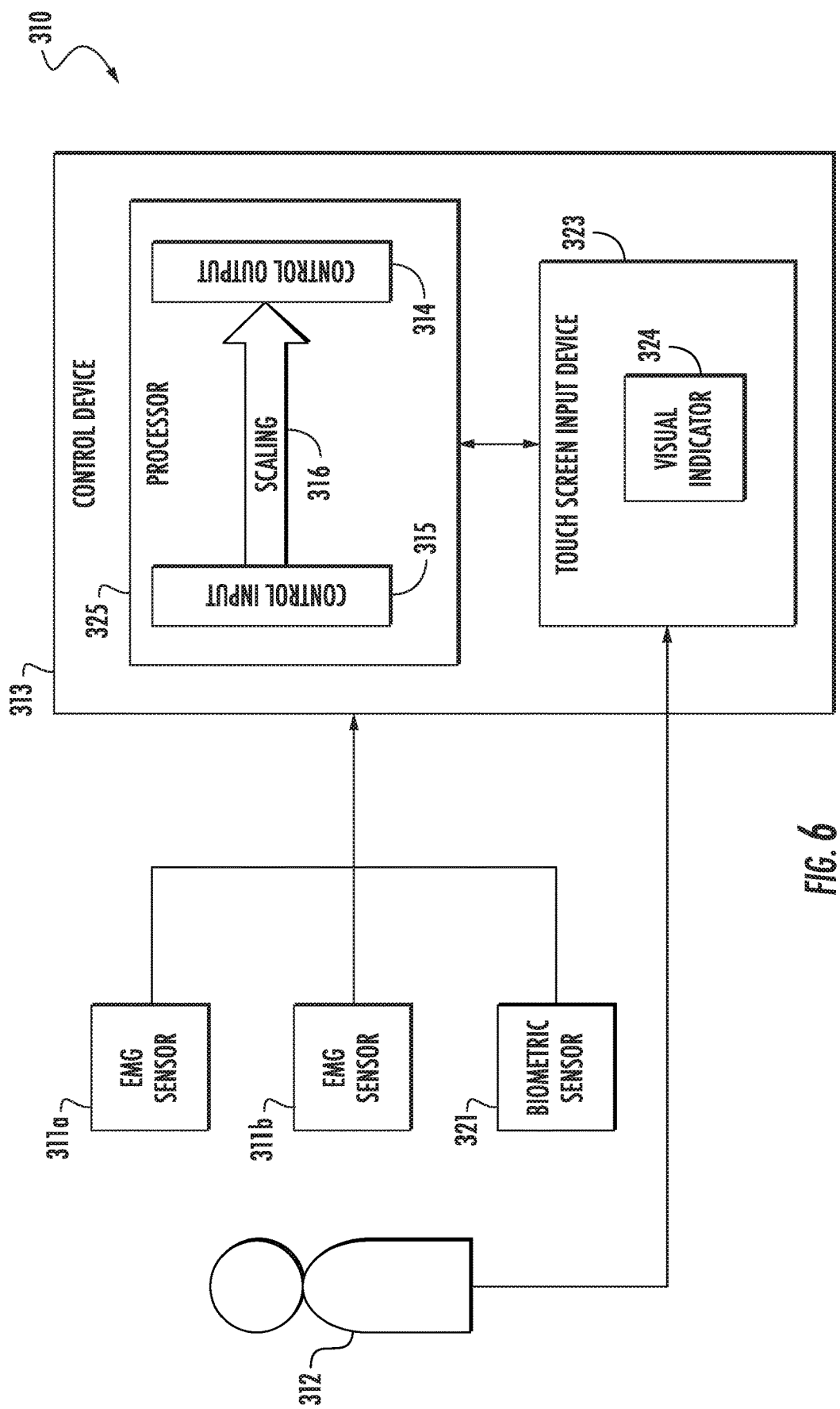
FIG. 6 is a schematic diagram of a third embodiment of the electronic device, according to the present disclosure.

Referring now additionally to FIG. 6, another embodiment of the electronic device 310 is now described. In this embodiment of the electronic device 310, those elements already discussed above with respect to FIGS. 1-2 are incremented by 300 and most require no further discussion herein. This embodiment differs from the previous embodiment in that this electronic device 310 illustratively includes the control device 313 comprising a touchscreen input device 323 (e.g. a touchscreen display in mobile communications device) to be manipulated by the user 312. The control device 313 illustratively comprises a processor 325 configured to perform the scaling 316 between the control input 315 and the control output 314. The touchscreen input device 323 is configured to display a visual indicator 324 responsive to the touchscreen input device.

Advantageously, electronic device 10, 110, 210, 310 may adjust controller sensitivity without a priori knowledge of the task being performed using biofeedback in the form of an electromyogram. Moreover, this controller sensitivity adjustment is performed without user action.

As will be appreciated, when performing precise movements, muscles become tense more than when performing imprecise movements. This tensing of muscles is due to muscle coactivation being used to increase joint stiffness, thus increasing limb stability. The EMG sensors of the electronic device 10, 110, 210, 310 can be used to detect muscle coactivation. From the muscle coactivation levels recorded by the electromyogram in the electronic device 10, 110, 210, 310, it can be determined how precisely the user intends to move based upon the user's tenseness.

When making precise movements, muscles within the same muscle group oppose one and other, whereas when not making precise movements, only one muscle in the muscle group is being primarily activated. Because the opposing muscles within a muscle group tense prior to movement, the users intention can be determined prior to the user making any input to the controller. Depending on the intent of the user the controller sensitivity can be increased or decreased. The electronic device 10, 110, 210, 310 may improve automatic controller sensitivity, and may provide advances in mechatronics, increased usage in safety critical industrial/military applications, and the desire to improve performance and safety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electronic device comprising: a pair of electromyography (EMG) sensors to be coupled to a user, each EMG sensor being associated with a respective one of opposing muscles of the user; and a control device configured to generate a control output based upon a control input and to change a scaling between the control input and the control output based upon the pair of EMG sensors; wherein the control device is configured to determine a muscle coactivation value based upon the pair of EMG sensors, and change the scaling between the control input and the control output based upon the muscle coactivation value.

2. The electronic device of claim 1 wherein said control device is configured to set the control output to a constant based upon the pair of EMG sensors exceeding a threshold.

3. The electronic device of claim 1 wherein said control device comprises an input device to be manipulated by the user.

4. The electronic device of claim 1 wherein said control device comprises a touchscreen input device to be manipulated by the user, and a visual indicator responsive to said touchscreen input device.

5. The electronic device of claim 1 further comprising a garment to be worn by the user and carrying said pair of EMG sensors.

6. The electronic device of claim 1 wherein the pair of EMG sensors comprises an electrode in contact with a respective muscle of the user.

7. The electronic device of claim 1 wherein said control device is configured to change the scaling based upon at least one other biometric value from the user.

8. The electronic device of claim 1 wherein said control device is configured to change the scaling without user interaction.

9. An electronic device comprising: a pair of electromyography (EMG) sensors to be coupled to a user, each associated with a respective one of opposing muscles of the user; and a control device comprising an input device to be manipulated by the user, and an actuator responsive to said input device; said control device configured to generate a control output based upon a control input and to change a scaling between the control input and the control output based upon said pair of EMG sensors; wherein the control device is configured to determine a muscle coactivation value based upon the pair of EMG sensors, and change the scaling between the control input and the control output based upon the muscle coactivation value.

10. The electronic device of claim 9 wherein said control device is configured to set the control output to a constant based upon said pair of EMG sensors exceeding a threshold.

11. The electronic device of claim 9 further comprising a garment to be worn by the user and carrying said pair of EMG sensors.

12. The electronic device of claim 9 wherein each EMG sensor comprises an electrode in contact with a respective muscle of the user.

13. The electronic device of claim 9 wherein said control device is configured to change the scaling based upon at least one other biometric value from the user.

14. The electronic device of claim 9 wherein said control device is configured to change the scaling without user interaction.

15. A method for making an electronic device, the method comprising: coupling a pair of electromyography (EMG) sensors to a user, each associated with one of opposite muscles of the user; and coupling a control device to the pair of EMG sensors and configured to generate a control output based upon a control input and to change a scaling between the control input and the control output based upon the pair of EMG sensors; wherein the control device is configured to determine a muscle coactivation value based upon the pair of EMG sensors, and change the scaling between the control input and the control output based upon the muscle coactivation value.

16. The method of claim 15 wherein the control device is configured to set the control output to a constant based upon the at least one EMG sensor exceeding a threshold.

17. The method of claim 15 wherein the control device comprises an input device to be manipulated by the user, and an actuator responsive to the input device.

18. The method of claim 15 further comprising forming a garment to be worn by the user and carrying the at least one EMG sensor.

* * * * *